United States Patent [19]

Arai

[11] Patent Number: 4,804,987
[45] Date of Patent: Feb. 14, 1989

[54] LENS-FITTED PHOTOGRAPHIC FILM PACKAGE

[75] Inventor: Takuya Arai, Tokyo, Japan

[73] Assignee: Fuji Photo Film Co., Ltd., Kanagawa, Japan

[21] Appl. No.: 103,369

[22] Filed: Sep. 30, 1987

[30] Foreign Application Priority Data

Oct. 3, 1986 [JP] Japan .............................. 61-151547[U]

[51] Int. Cl.$^4$ .......................... G03B 3/02; G03B 17/02
[52] U.S. Cl. ..................................... 354/219; 354/288
[58] Field of Search .............. 354/202, 219, 275, 288; 224/908; 33/266

[56] References Cited

U.S. PATENT DOCUMENTS

| | | | |
|---|---|---|---|
| 2,751,825 | 6/1956 | Fried | 354/288 |
| 3,731,586 | 5/1973 | Meazza | 354/219 |
| 4,138,045 | 2/1979 | Baker | 354/288 |
| 4,216,589 | 8/1980 | Beaver | 354/219 |
| 4,690,534 | 9/1987 | Liang | 354/219 |
| 4,751,536 | 6/1988 | Ohmura et al. | 354/288 |

FOREIGN PATENT DOCUMENTS 1032486 6/1966 United Kingdom .
1310263 3/1973 United Kingdom .

*Primary Examiner*—A. A. Mathews
*Attorney, Agent, or Firm*—Young & Thompson

[57] ABSTRACT

A lens-fitted photographic film package comprises an internal film casing of plastic provided with a taking lens and incorporating a film contained in a light-tight film container and an external film casing of cardboard or thin plastic formed with front and rear openings which define a viewfinder when the internal film casing is inserted in the external film casing. The optical path of the viewfinder is disposed above and is unobstructed by the internal casing. Portions of the internal casing can be extended upwardly on opposite lateral sides of the optical path of the viewfinder so as to dispose the viewfinder in an upwardly and forwardly and rearwardly opening recess in the internal casing, thereby more completely to support the external casing. The cost of providing viewfinder holes through the internal casing is thus saved.

13 Claims, 1 Drawing Sheet

LENS-FITTED PHOTOGRAPHIC FILM PACKAGE

BACKGROUND OF THE INVENTION

The present invention relates to a photographic film package, and more particularly to a photographic film package in which a photographic film cartridge, a taking lens and an exposure device, with their associated elements, are incorporated in a light-tight film casing as an integral whole.

It has heretofore been customary to take pictures by using a camera and a film which are separately sold. Often, however, amateur photographers do not have their camera with them when they want to take pictures. It would not be feasible to buy a new camera every time this happens, for although films are readily available and are not very expensive, cameras are relatively expensive and are intended to be used for a long time.

Accordingly, it is desirable to provide a lensfitted photographic film package provided with simple exposure means which can be sold at a low cost comparable to a conventional film and which is available wherever ordinary photographic films are sold and which, after the exposure of all frames of the film, is forwarded to a photo shop in its entirety as easily as conventional films.

One such lens-fitted photographic film package on the market has an internal plastic film casing with a film cartridge, a taking lens, a viewfinder, a shutter, a film advancing mechanism, and their associated elements incorporated therein, and an external paper or cardboard film casing tightly enclosing the plastic film casing. The provision of the external film casing makes it unnecessary to decorate the outer surface of the internal film casing, resulting in a lens-fitted photographic film package of low cost.

The lens-fitted photographic film packages already commercially available have a viewfinder which is formed by providing a hole through the internal plastic film casing. For forming the viewfinder hole in the internal plastic film casing, a complicated configuration of metal mold is necessary and the lens-fitted photographic film package tends to be large in size.

OBJECTS OF THE INVENTION

It is therefore an object of the present invention to provide a lens-fitted photographic package in which a viewfinder is formed in the external film casing that encloses the internal film package.

It is another object of the present invention to provide a lens-fitted photographic film package which can be manufactured at low cost.

SUMMARY OF THE INVENTION

According to the present invention, the lensfitted photographic film package comprises a generally rectangular box-shaped internal film casing which is provided with a space defined by a pair of side walls at the top and a rectangular box-shaped external film casing with a pair of openings spaced from and located in alignment with each other enclosing the internal film casing tightly therein. Due to the provision of the viewfinder in the external film casing made of, in particular, cardboard, the internal film casing can be simplified in shape, made light in weight, and manufactured at a low cost. Furthermore, because of the simplified shape of the internal film casing, its metal mold can be also simplified in shape and formed with ease.

BRIEF DESCRIPTION OF THE DRAWINGS

These and other objects and features of the present invention will become apparent from the following description taken in conjunction with the preferred embodiments thereof shown in the accompanying drawings in which like parts are denoted by like reference numerals throughout the views of the drawings and wherein.

DETAILED DESCRIPTION OF THE INVENTION

The lens-fitted photographic film package according to the preferred embodiments of the present invention incorporates various elements similar to those of still cameras. Because such elements are well known to those skilled in the art, this description will be directed in particular to elements forming part of, or cooperating directly with, the lens-fitted photographic film package embodying the present invention.

Figure 1:
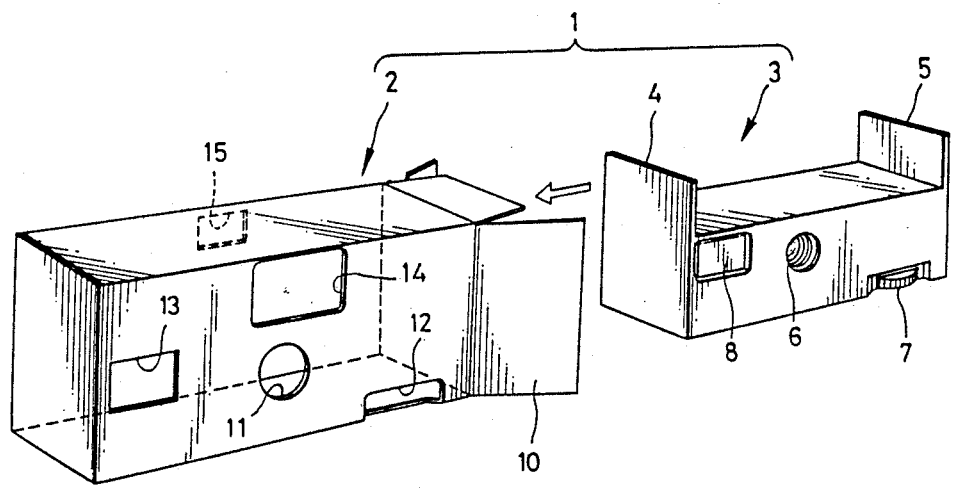
FIG. 1 is an exploded perspective view of the lens-fitted photographic film package of one embodiment of the present invention wherein the internal film casing is shown outside and to the right of the external film casing.

Referring now to FIG. 1, showing a lens-fitted photographic film package (which is hereinafter referred to as a film package for simplicity) of the present invention, the film package 1 comprises a rectangular box-shaped internal film casing 3 in which a film cartridge is light-tightly enclosed and which is provided with a pair of side walls 4 and 5 formed integrally with and extending upwardly from the top of the internal film casing 3, and an external film casing 2 in which the internal film casing 3 is encased tightly. The internal film casing 3, which is desirably made of plastic, is provided with a taking lens 6, a film advancing knob 7, and a shutter release member 8 all of which are well known per se and are positioned in its front wall.

The internal film casing 3 described above is inserted into and packed tightly in the external film casing 2 which is of a printable cardboard or a printable thin plastic sheet or the like. The blank for making the external film casing 2, to which printing and/or an ornamental surface pattern can be applied, has a simple unfolded shape. The external film casing 2 is formed with a circular opening 11, a rectangular opening 12, and a rectangular opening 13, located correspondingly to the locations of the taking lens 6, the film advancing knob 7, and the shutter release member 8 of the internal film casing, respectively.

Located above the opening 11 for the taking lens 6 is a rectangular opening 14 formed in a front wall of the external casing 2 which forms a viewfinder in cooperation with a rectangular opening 15 formed in a rear wall of the external casing 2. The openings 14 and 15 are so sized and axially spaced as to define a field of view identical to, or slightly narrower than, the field of view of the taking lens 6. It is to be noted that no portion of the internal casing 3 obstructs the openings 14 and 15 when the internal casing 3 is inserted in the external casing 2.

After the insertion of the internal film casing into the external film casing, the flaps 10 of the external film casing 2 are folded and adhesively secured to close the external film casing in order to complete the film package 1.

As the operating members such as the film advancing knob 7 and the shutter release button 8 are so incorporated in the internal film casing 3 as to be flush with the outer surface of the internal film casing 3 and the height of the external film casing 2 is equal to the height of the internal film casing including the side walls 4, 5, the internal film casing 3 can be inserted into the external film casing 2 without catching on anything Furthermore, although the internal film casing 3 has a relatively large space on the top thereof, nevertheless the empty portion of the external film casing 2 including the viewfinder will not collapse, thanks to the provision of the side walls 4 and 5 integrally formed with the internal film casing 3.

In use of the film package 1 of the present invention, the film package 1 is used as it is, namely without taking the internal film casing 3 out of the external film casing 2 because the shutter release button 8 and the film advancing knob 7 are accessible from the outside of the external film casing 2. After all the frames of the film in the film package 1 are exposed, the film package 1 with the film contained therein is forwarded to a photo shop or photo laboratory to develop the film and to make prints from the developed film. There, after removing the external film casing 2, the internal film casing 3 is broken open to remove the film cartridge. The developed film and the prints made therefrom are returned to the customer, but the opened lens-fitted film package 1 with the film cartridge removed is not returned.

Figure 2:
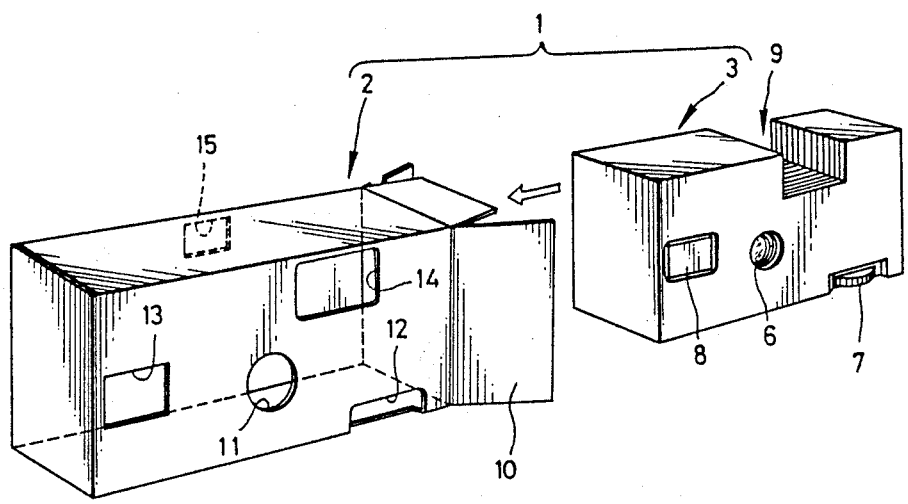
FIG. 2 is an exploded perspective view of a lens-fitted photographic film package similar to that of FIG. 1 but showing another embodiment of the present invention.

Reference is now had to FIG. 2 showing a modification of the embodiment of FIG. 1 which has the same external appearance as that of FIG. 1. The only difference of this modified embodiment is that the internal film casing 3 has an upwardly open rectangular recess 9 with grooves on the inner surfaces thereof or rough matted inner surfaces which serve to prevent diffused reflected light from entering, thereby to provide an easy and clear observation of an object to be photographed. The recess 9 forms a tunnel-like viewfinder in cooperation with the top wall of the external film casing 2. The opening 9 is sized not to obstruct the openings 14 and 15 formed in the external casing 2, thereby substantially defining the tunnel-like viewfinder by the openings 14 and 15.

The above embodiments can include a film with backing paper contained in a 110-size film cartridge; or alternatively, any of various forms of film cartridges already commercially available may be used. For example, a 135-size film patrone defined by the International Standardization Organization (ISO 1007; 1979 edition) can be incorporated in the internal film casing by making only a minor change in the interior mechanism thereof.

It will be understood that various changes in the form, details and arrangement will be apparent to those skilled in the art. Therefore, unless otherwise such changes depart from the scope of the present invention as defined by the appended claims, they should be construed as included therein.

What is claimed is:

1. A photographic film package provided with a taking lens incorporating a film contained in a film container light-tightly therein comprising:
   an internal film casing formed with a space on the top thereof that is upwardly and forwardly and rearwardly open and is closed by portions of the internal casing on two opposite lateral sides thereof; and
   an external film casing formed with an opening in each of front and rear walls thereof, said openings forming a tunnel-like viewfinder whose optical path extends through said space when said internal film casing is inserted in said external film casing.

2. A photographic film package as defined in claim 1, wherein said space is defined between side walls extending upwardly from the top of said internal film casing.

3. A photographic film casing as defined in claim 1, wherein said space is formed by a U-shaped channel in said internal casing.

4. A photographic film package as defined in claim 3, wherein said U-shaped channel has a rough matted inner surface.

5. A photographic film package as defined in claim 3, wherein said U-shaped channel is formed with grooves on its inner surface 6. A photographic film package as defined in claim 1, wherein said external film casing is made of a printable cardboard.

7. A photographic film package as defined in claim 1, wherein said external film casing is made of a printable thin plastic sheet.

8. A photographic film package comprising an internal film casing provided with a taking lens and incorporating a film contained in a film container light-tightly therein and an external film casing formed with front and rear openings which define a viewfinder whose optical path is disposed above and is unobstructed by said internal film casing when said internal film casing is inserted in said external film casing, said external film casing having opposite end walls that extend higher than said openings when said viewfinder is in use and a top wall that interconnects said end walls and is higher than said openings when said viewfinder is in use.

9. A photographic film package as defined in claim 1, wherein said internal and external film casings are parallelpipedal.

10. A photographic film package as defined in claim 8, wherein said internal and external film casings are parallelepipedal.

11. A photographic film package comprising a lens-fitted internal film casing incorporating a roll of film light-tightly therein and formed with an opening extending through said internal film casing from front to rear for forming a part of a viewfinder and an external film casing formed with front and rear openings which are aligned with said opening of said internal film casing when said internal film casing is inserted in said external film casing so as to define the field of view of said viewfinder.

12. A photographic film package as defined in claim 11, wherein said front opening is larger than said rear opening.

13. A photographic film package as defined in claim 11, wherein said internal and external film casings are parallelepipedal.

* * * * *